United States Patent Office 3,451,541
Patented June 24, 1969

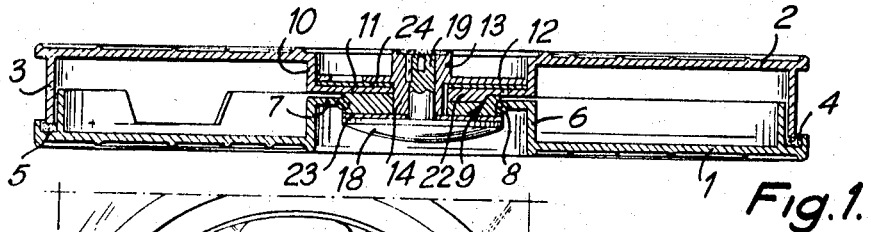
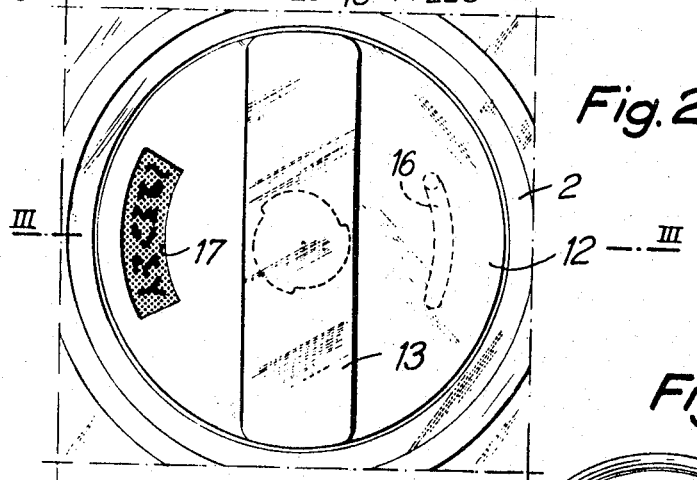
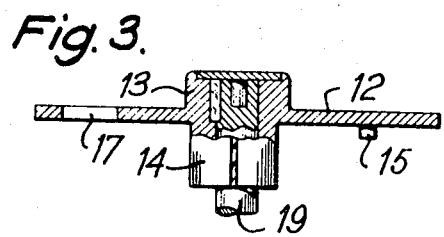
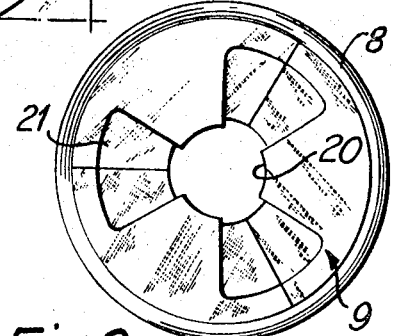
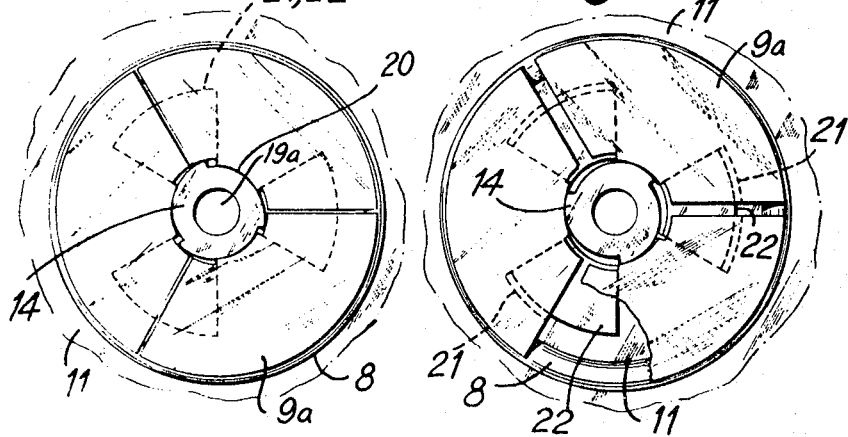

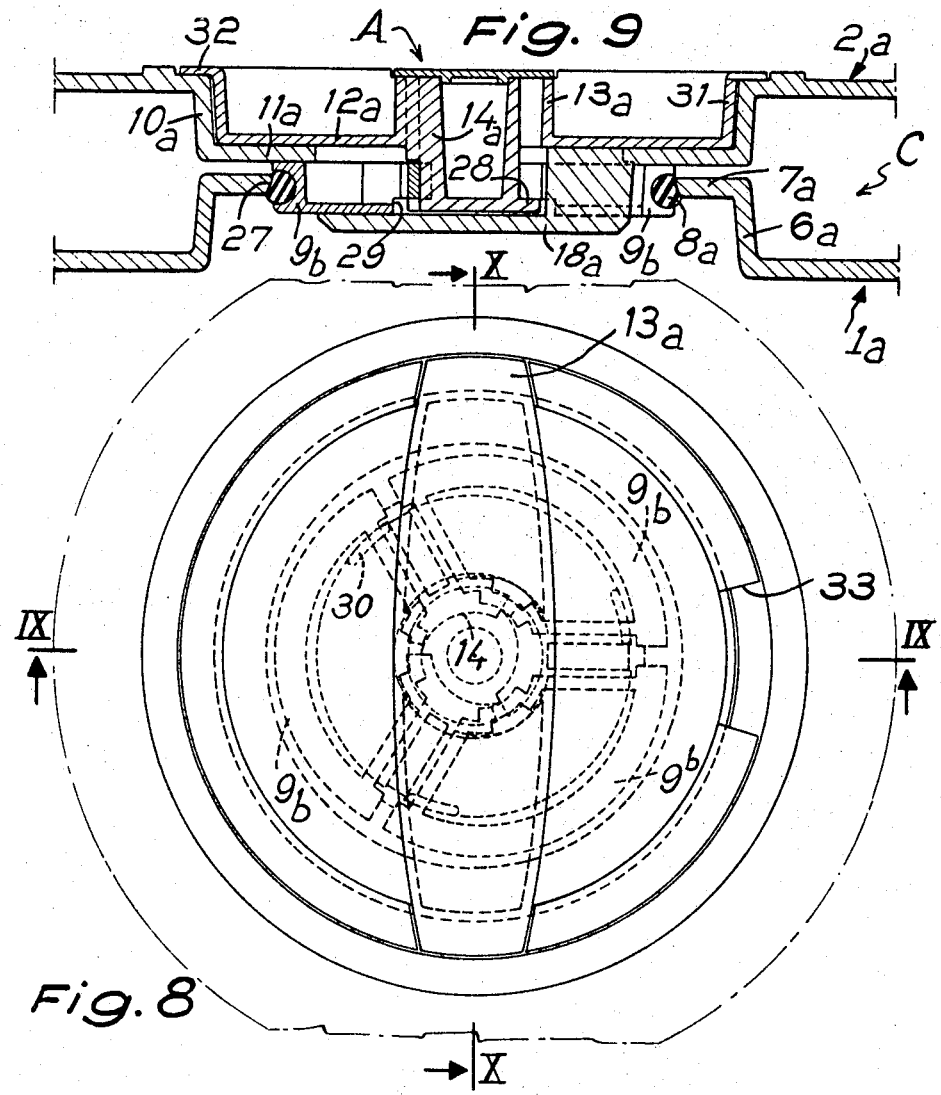
Fig. 9
Fig. 8
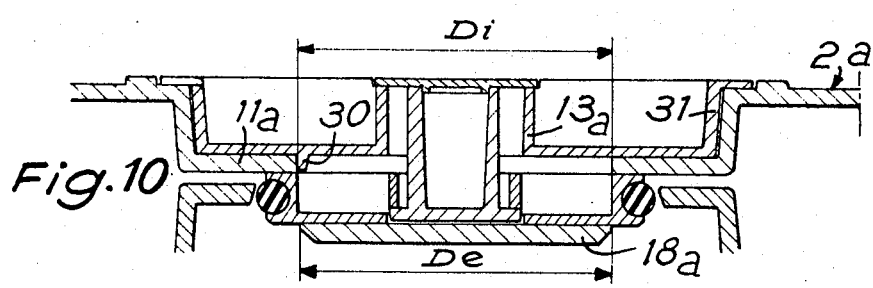
Fig. 10

3,451,541
LOCKING DEVICE FOR A BOX ADAPTED TO CONTAIN A SPOOL OF MATERIAL
Pierre A. L. Posso, 20 Rue Gandon, Paris, France
Continuation-in-part of application Ser. No. 616,932, Feb. 17, 1967. This application Mar. 1, 1968, Ser. No. 709,717
Claims priority, application France, June 30, 1967, Addition 112,641
Int. Cl. B65h 55/00, 75/02
U.S. Cl. 206—52                                        9 Claims

ABSTRACT OF THE DISCLOSURE

Locking device for securing together two disc-like components of a cylindrical box adapted to contain a film or tape spool. The device includes a central axial cam shaft rotatably supported in a central, circular recess portion in a first disc-like component. The shaft has cam portions which engage sector segments disposed about the shaft, for urging the sector segments outwardly whereby an elastic ring surrounding the sector segments is expanded and forced into contact with a circular inner surface bounding an opening in the other component, whereby the components are locked together in sealed relation.

Cross related application

This application is a continuation-in-part of my prior application Ser. No. 616,932 filed February 17, 1967, now abandoned.

Brief summary of the invention

This invention relates to boxes designed to contain spools of relatively large diameter in relation to their axial dimension. Such spools may be used, for example, for motion picture films and magnetic tapes.

The tightness of such boxes must be rigorous in the case of magnetic tapes used for electronic computers and the like, since such tapes must be protected against dust and moisture. Furthermore, when closed, the box must at the same time clamp the spool in position.

It has accordingly been proposed to interpose between the edge of the lid and the box a natural or synthetic rubber seal against which the lid is held pressed by a central locking device urged into position by a member formed with helicoid ramps thereon.

Locking devices theretofore used made use of the incompressibility of rubber, by utilizing a rotating actuating member carried by one of the box portions subjecting a rubber ring to an axial pressure which was converted into a radial pressure by the ring against the circular edge of a female part rigid with the other box portion.

In such known locking devices the rubber ring had to have a small diameter so as to receive from the rotating actuating member an adequate axial pressure without it being necessary to exert excessive force on the members. The resulting drawback was that the two box portions (the bottom and the lid) where not evenly applied against the seal and slight relative movements detrimental to good sealing could take place.

It is an object of the present invention to overcome this drawback by imparting to the central rubber seal a diameter close to that of the central recess in the box whereby upon actuation of a rotatable actuating member, a rubber toroidal seal is caused to undergo a direct radial expansion without axial compression, by means of radially slidable members, with ramps interposed between these members and the actuating member.

It is a further object of this invention to provide an improved device with a reduced number of parts so as to lower its manufacturing cost.

According to one embodiment of the invention, the support disc of the sectors is integral with an annular support base for the control member and is connected to this base by radial webs situated between the sectors and connecting the support disc and support base.

The central shaft which is integral with the control member and carries the cams is extended beyond the sectors and includes a holding flange which extends between the sectors and the disc.

The sectors have notches for receiving the holding flange of the control cam shaft.

Brief description of the drawings

FIGURE 1 shows the box assembly in axial section;
FIGURE 2 is an external plan view on an enlarged scale of the locking device;
FIGURE 3 is an axial section through the line III—III of FIGURE 2, showing the actuating member;
FIGURE 4 is a plan view of the locking member;
FIGURES 5 and 6 are views taken from underneath of the locking member, shown respectively in its inoperative position and in its locking position;
FIGURE 8 is an overall plan view of a portion of the device of FIGURE 7 in the locking position;
FIGURE 9 is a section taken on line IX—IX in FIGURE 8 and shows the details of construction at the outer edge of the box at the right hand side of the figure;
and
FIGURE 10 is a section taken on line X—X in FIGURE 8, the device being shown in the open position.

Referring now to FIGURE 1, therein is shown a circular box preferably made from transparent plastic and which includes a case 1 and a lid 2 adapted to be engaged over the case. The lower edge of a lateral wall 3 of lid 2 bears against a seal 4 held in a peripheral channel 5 formed on the bottom of case 1.

Figure 7:
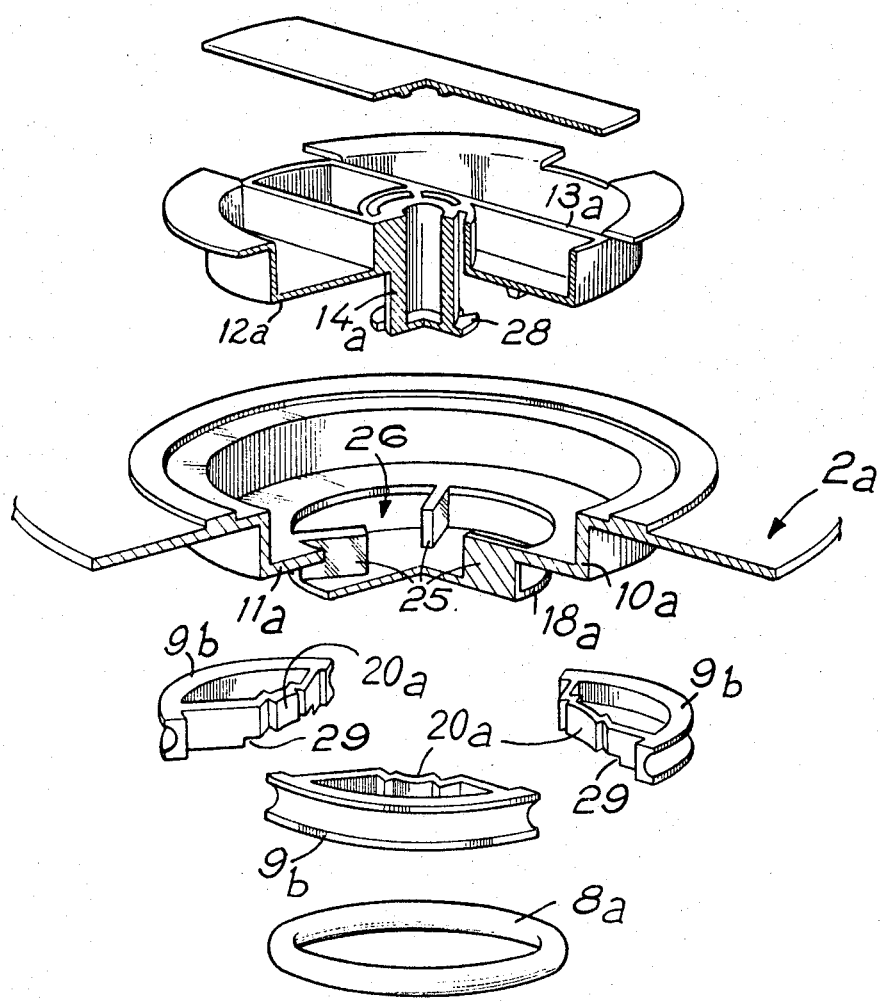
FIGURE 7 is an exploded view showing in perspective the various elements of a second embodiment of the device according to the invention.

In its central region, case 1 is formed with an upstanding cylindrical portion 6 having a circular flange 7 into which a locking member 9, to be described hereinafter, is engaged by means of an annular seal 8.

In the central region of the lid 2 there is formed an upstanding cylindrical portion 10 terminating in an annular portion 11 through the center of which is engageable an actuating member 12 consisting of a disc which has a diameter equal to the inner diameter of the cylindrical portion 10 and which is rigidly connected with an outwardly portrudingg rip-forming boss 13 and with an inwardly extending camming cylinder 14 (FIGURES 1 and 3).

The lower surface of disc 12 is formed with a pin 15 which is engageable in an arcuate groove 16 formed in the annular wall 11, which wall has moulded thereon the inscriptions "open" and "closed" alternately appearing in a window 17 of disc 12, depending on the position thereof in relation to wall 11.

Locking member 9 consists of three 120° sectors 9a which are held together by means of the engagement of the annular rubber ring 8 in a lateral groove formed on the edge of the three sectors 9a. A disc 18 carries the three sectors 9a in a common plane between disc 18 and wall 11. These sections are guided radially by means of the sliding engagement of male sectors 22 moulded onto the lower face of wall 11 and female sectors 21 formed in the sectors 9a.

A pin 19 rigidly connected to the disc 18 extends upwardly from the center thereof and passes through an axial bore 19a formed in locking member elements 13 and 14.

A plurality of anti-friction discs 23 and 24 are positioned between locking member 9, wall 11, disc 18 and disc 12.

The lateral surface of element 14 is formed by three angularly spaced cams 120° apart which fit snugly into an axial opening being in turn formed with three cam followers 20 adapted to cooperate with the cams of element 14.

The locking device hereinbefore described works in the following manner; with the device in the "open" position, lid 2 is placed over case 1, the operating grip 13 is then rotated through an angle equal to that subtended by grooves 16, thereby causing the inscription "closed" to be displayed in window 17. In the process, the camming elements of member 14 cooperate wit the cam followers 20 of member 9 and spread the three portions thereof radially thereby subjecting the rubber ring 8 to an increase in diameter and causing it to be firmly applied against the edge of annular wall 7 of case 1 (see FIGURES 5 and 6).

Since sealing ring 8 is of relatively large diameter, the case 1 and the lid 2 will be correctly located in relation to each other, and along with the outer seal will ensure that the box remains fluid-tight.

Referring now to FIGURES 7 to 10, therein is shown a container having a case 1a formed with a central cylindrical portion 6a having a circular flange 7a with a central opening therein. The opening in flange 7a is sealed by an annular elastic member 8a which is carried on a locking member composed of a number of angular sector members 9b similar to angular sectors 9a.

In its own central region, lid 2a is formed with a recess portion as shown in FIG. 7 which includes a cylindrical rim portion 10a terminating in an annular base portion 11a. An actuating or control member A has a disc 12a which rotatably rests on base 11a and has a diameter equal to the inner diameter of cylindrical rim portion 10a. The disc 12a is rigidly connected to a manually engageable portion 13a and is provided with a depending cam shaft 14a.

The lid 2a includes a disc 18a which is integrally joined with base 11a by radial webs 25. The base 11a and disc 18a are spaced from one another and the sector members 9b rest on disc 18a between adjacent webs 25. The sector members 9b have inwardly facing cam follower surfaces 20a which are acted on by cam shaft 14a to expand member 8a and lock the lid 2a in the casing 1a in a manner to be explained more fully later.

The upper surfaces of webs 25 are in the same plane as the upper surface of base 11a and moreover, the webs 25 extend close to the cam shaft 14a. The disc 18a and webs 25 can thus very easily be molded with the lid 2a. However, in order to simplify the mold in which the lid in produced, it is advantageous for the internal diameter Di of the annular base 11a to be substantially equal to the external diameter De of the disc 18a. These diameters will only vary by the clearance slope necessary for removing the molded lid 2a from the mold. If this arrangement is adopted, the mold can be made in only two parts and it is only necessary to provide, between the base 11a to be substantially equal to the exernal diameter De of the disc 18a. These diameters will only vary by the clearance slope necessary for removing the molded lid 2a from the mold. If this arrangement is adopted, the mold can be made in only two parts and it is only necessary to provide, between the base 11a and the disc 18a, mold inserts which can be withdrawn laterally.

The locking members 9b consist of three 120° sectors which are united by the engagement of annular member 8a into lateral grooves formed in the three sectors.

The external surface of cam shaft 14a is formed of three cams spaced angularly at 120° from one another, and the shaft 14a fits snugly in an axial opening formed in locking members 9b by the three cam follower surfaces 20a.

The three sectors 9b are placed in position across lateral openings 26 against the three webs 25 and between the annular base 11a and the disc 18a. They are thus perfectly positioned and guided with sufficient precision in translation when they are pushed radially by the cams on shaft 14a with no external guide sectors needed.

This locking device operates as follows:

The lid 2a with the control member A supported thereon is inserted into the opening in flange 7a. The portion 13a is then manually engaged and control member A is rotated to cause the cams on shaft 14a to act on cam follower surfaces 20a on sectors 9b and move the sectors radially outwards against the action of elastic member 8a. The member 8a increases in diameter and is applied with pressure against the edge of flange 7a of case 1a to form a seal between case 1a and lid 2a.

The edge of flange 7a is conically tapered as shown at 27 to cooperate under the best possible conditions with the member 8a.

In order to limit axial movement of the control member A relative to the lid 2a, the cam shaft 14a has a holding flange 28 at the lower edge thereof which is interposed between the sectors 9b and the disc 18a.

The sectors 9b have notches 29 for receiving the flange 28. It is also possible to provide a hollow recess in the disc 18a for seating the flange 28.

To limit the extent of pivoting of the control member, three tongues 30 are formed under the disc 12a to project between the webs 25 which serve as limiting abutments. The disc 12a has a cylindrical rim 31 and a ledge 32 which bears against the top of the lid 2. The ledge 32 has a notch 33 which reveals the inscription "closed" or the inscription "open" on the said lid according to the position occupied of the control member A.

Assembly of the device is very simple. All that is required is to engage the control member A in the lid 2a and the cam shaft 14a between the webs 25 and then slide the three sectors 9b between the base 11a and the disc 18a until they cover the flange 28 of the cam shaft, after which the elastic member 8a is fitted into the recesses of the three sectors to keep these in place.

Dismantling of these various elements can also be effected easily by proceeding in reverse.

What is claimed is:

1. A container comprising first and second coaxially engageable members adapted for being locked and unlocked, said first member having an opening therein; said second member including a central recess portion extending into said opening in the first member, a plurality of independent sector members cooperatively defining a circular outline, an elastic member encircling the sector members and peripherally engaging the same, means in said recess portion supporting the sector members therein and including radial webs for guiding radial movement of the sector members, said sector members having inwardly facing surfaces cooperatively defining a central cavity, and control means rotatably mounted on said second member and extending into the central recess portion therein for engaging said sector members to move the same radially outwards against the action of the elastic member as the control means is rotated, said control means comprising a cam member extending into said cavity and engaging the inwardly facing surfaces of the sector members, said elastic member being engaged by the sector members to be positioned in said opening of the first member such that with the control means in a first limit position the sector members are urged inwards by the elastic member and the second member can be freely displaced in the first member, whereas with the control means in a second limit position the sector members are urged outwardly to urge the elastic member into sealing engagement with the first member whereby said members are locked.

2. A container as claimed in claim 1 wherein said recess portion includes an annular base with an opening therein and an annular disc spaced from said base, said sector members resting on said base and being confined between the base and disc.

3. A container as claimed in claim 2 wherein said radial webs connect the base and disc, said sector members being received between adjacent webs.

4. A container as claimed in claim 1 wherein said control means further comprises a manually engageable control member, and a disc secured to said control member resting rotatably on the base of said recess portion, said cam member being a cam shaft integral with the control member and the disc secured thereto.

5. A container as claimed in claim 3 comprising abutment means on said control means extending into the opening in said annular base for contacting said radial webs in said limit positions.

6. A container as claimed in claim 2 wherein said disc on the recess portion has an outer diameter which is substantially equal to the diameter of the opening in said annular base.

7. A container as claimed in claim 4 comprising upstanding rims respectively encircling the disc on the control member includes an annular ledge which overlaps rim on said disc being engaged within the rim on said base.

8. A container as claimed in claim 3 wherein said cam member includes a holding disc at the lower end thereof, said sector members being provided with notches at the lower ends thereof for receiving the holding disc on the cam member.

9. A container as claimed in claim 5 wherein said control member includes an annular ledge which overlaps the second member, said ledge having a notch therein through which indicia on the second member is visible to indicate the locked and unlocked condition of said first and second members.

References Cited

UNITED STATES PATENTS

| 299,676 | 6/1884 | Poland | 220—24.5 |
| 3,002,705 | 10/1961 | Isbell | 220—24.5 |
| 3,343,666 | 9/1967 | Mathus. | |

FOREIGN PATENTS

| 533,492 | 11/1956 | Canada. |

WILLIAM T. DIXSON, Jr., *Primary Examiner.*

U.S. Cl. X.R.

220—24.5